United States Patent
Sasuta et al.

[11] Patent Number: 5,502,767
[45] Date of Patent: Mar. 26, 1996

[54] METHOD FOR MAINTAINING SECURE INFORMATION SYNCHRONIZATION ON A CONTROL CHANNEL

[76] Inventors: Michael Sasuta, 1661 Blackburn Dr., Mundelein, Ill. 60060; Alan L. Wilson, 3720 Alder Dr., Hoffman Estates, Ill. 60195-1505

[21] Appl. No.: 250,073

[22] Filed: May 27, 1994

[51] Int. Cl.⁶ .................................................. H04L 9/12
[52] U.S. Cl. ............................ 380/48; 380/20; 380/49
[58] Field of Search ............................ 380/20, 21, 28, 380/33, 48, 49

[56] References Cited

U.S. PATENT DOCUMENTS

| | | | |
|---|---|---|---|
| 4,514,761 | 4/1985 | Merrell et al. | 380/20 |
| 4,635,113 | 1/1987 | Okada et al. | 380/20 X |
| 4,688,247 | 8/1987 | Davidov | 380/20 X |
| 4,727,579 | 2/1988 | Wright et al. | 380/20 |
| 5,054,068 | 10/1991 | Hess et al. | 380/49 |
| 5,177,791 | 1/1993 | Yeh et al. | 380/21 X |
| 5,185,797 | 2/1993 | Barrett et al. | 380/21 |
| 5,243,650 | 9/1993 | Roth et al. | 380/20 X |

Primary Examiner—Bernarr E. Gregory
Attorney, Agent, or Firm—Susan L. Lukasik

[57] ABSTRACT

Synchronization of secure information on a control channel (104) of a secure radio trunking communication system (100), is maintained by periodically transmitting control encryption parameters (CEP) (111) by the controller (101) on the control channel (104). A secure communication unit (102 and 103) may receive and store the CEP (111) in memory (108 and 109), and subsequently, use the stored CEP (111) to communicate securely with the controller (101) on the control channel (104). When the secure communication unit is assigned to a working channel (105–107), the controller periodically sends the CEP (117) to the secure communication unit (102 and 103) on the working channel (105–107). When the secure communication unit (102 and 103) returns to the control channel (104), the secure communication unit may use the CEP (117) stored in the memory (108 and 109) to communicate securely on the control channel (104).

13 Claims, 2 Drawing Sheets

METHOD FOR MAINTAINING SECURE INFORMATION SYNCHRONIZATION ON A CONTROL CHANNEL

FIELD OF THE INVENTION

This invention relates generally to radio communication systems, including but not limited to secure radio trunking communication systems.

BACKGROUND OF THE INVENTION

Information transceived in a radio communication system can be protected using an encryption algorithm, whereby, only communication units that are provided with the encryption algorithm and associated encryption parameters may communicate securely. Such a system is commonly referred to as a secure radio communication system and is well known in the art. Similarly, secure radio trunking communication systems are also well known in the art and typically comprise a controller that is operably connected to a predetermined number of repeaters, providing communication channels to a plurality of secure communication units. Typically, one of the communication channels is used as a control channel while the other communication channels are used as working channels. The controller, upon receiving a request, allocates a working channel to the secure communication unit, via the control channel. To ensure information in such systems is communicated securely, the information on the working channels and the control channel may be protected with encryption. For example, protecting information on the control channel ensures that the system is protected from malicious parties copying and replaying the control information on the control channel. In a secure radio trunking system, the controller maintains secure information that includes control encryption information (CEI) and control encryption parameters (CEP) to encrypt/decrypt information on the control channel, and working encryption parameters to encrypt/decrypt information on the working channels. The CEP may include components that change with time and the controller maintains the CEP to reflect these changes. In normal operation, when a secure communication unit comes on the system, the controller provides the secure communication unit with the CEI and CEP which is subsequently stored in an internal memory device. In order to communicate securely on the control channel, the stored CEP should be substantially similar to the CEP at the controller. Since the CEP at the controller changes, the controller periodically updates the stored CEP by transmitting the CEP, on the control channel, hence, maintaining synchronization between the CEP at the controller and the stored CEP. While on the control channel, the secure communication unit continues to receive the periodic updates, however, when the controller assigns the secure communication unit to a working channel, the secure communication unit is no longer able to receive the periodic updates. As a result, upon returning to the control channel the stored CEP may not be synchronized with the CEP at the controller and the secure communication unit may not be able to communicate securely. In order to restore secure communication capability, the controller has to re-transmit the CEI and CEP to the secure communication unit on the control channel. This retransmission takes up a significant period of time and prevents the control channel from servicing other secure communication units, thus, reducing the efficiency of the secure communication system. This situation is further compounded when a large number of secure communication units are operating on the system.

Alternatively, the secure communication unit is provided with an internal mechanism that uses the resources of the secure communication unit to independently maintain synchronization of the stored CEP when the secure communication unit is away from the control channel. The changes in the CEP at the controller are time variant according to a predetermined encryption algorithm, however, due to the limited resources available in the secure communication unit relative to the controller, the internal mechanism is not able to maintain synchronization of the stored CEP, according to the predetermined encryption algorithm at the controller, for an extended period of time. Hence, when the secure communication unit returns to the control channel after being away on a working channel for at least the extended period of time, the stored CEP may no longer be synchronized with the CEP at the controller. As a result, the secure communication unit is not able to communicate securely on the control channel. In order to restore secure communication capability on the control channel to the secure communication unit, the controller has to re-transmit the CEI and CEP to the secure communication unit on the control channel, reducing the efficiency of the secure radio communication system, as already described above. Another limitation of this method is the added complexity of designing the secure communication unit with the internal mechanism requiring a longer design period. Yet another limitation of this method is the amount of resources of the secure communication unit, such as power, that are utilized to support the internal mechanism. Use of these limited resources could affect performance parameters, such as battery life, of the secure communication unit.

Therefore, a need exists for a method of maintaining secure information synchronization on a control channel that will not reduce the efficiency of a secure radio communication system, and have minimal impact on the design and resources of a secure communication unit.

DESCRIPTION OF A PREFERRED EMBODIMENT

Generally, the present invention provides a method for maintaining secure information synchronization on a control channel of a secure radio trunking communication system. This may be accomplished by protecting the information communicated on the control channel with encryption, where the controller and a secure communication unit may use control encryption parameters (CEP) to communicate securely on the control channel. Initially, the controller provides the CEP to the secure communication unit which, in turn, stores the CEP in a memory. To ensure synchronization between the secure communication unit and the controller, the controller periodically transmits the CEP on the control channel. While on the control channel, the secure communication unit receives the periodic CEP updates. When the secure communication unit is assigned to a working channel, the controller also sends the periodic CEP updates on the working channel, thus, continuing to update the secure communication unit and maintaining synchronization between the CEP at the controller and the stored CEP. With such a method, secure communication units are continuously updated with current CEP information regardless of whether the unit is monitoring the control channel or is assigned to a working channel, which was not the case with prior art systems.

In a communication system that provides secure communications, a method for maintaining secure information synchronization on a control channel comprises periodically transmitting control encryption parameters on the control channel, wherein the control encryption parameters are encrypted using a first encryption algorithm. When a secure communication unit is assigned a working channel, transmitting working encryption parameters are transmitted on the working channel, wherein the working encryption parameters are encrypted using a second encryption algorithm. When the secure communication unit is assigned the working channel, the control encryption parameters are transmitted on the working channel, wherein the control encryption parameters are encrypted using the second encryption algorithm. The control encryption parameters may be transmitted periodically to the secure communication unit. An encryption indication may be provided for each control transaction, wherein the encryption indication indicates whether a particular control transaction is encrypted.

Figure 1:
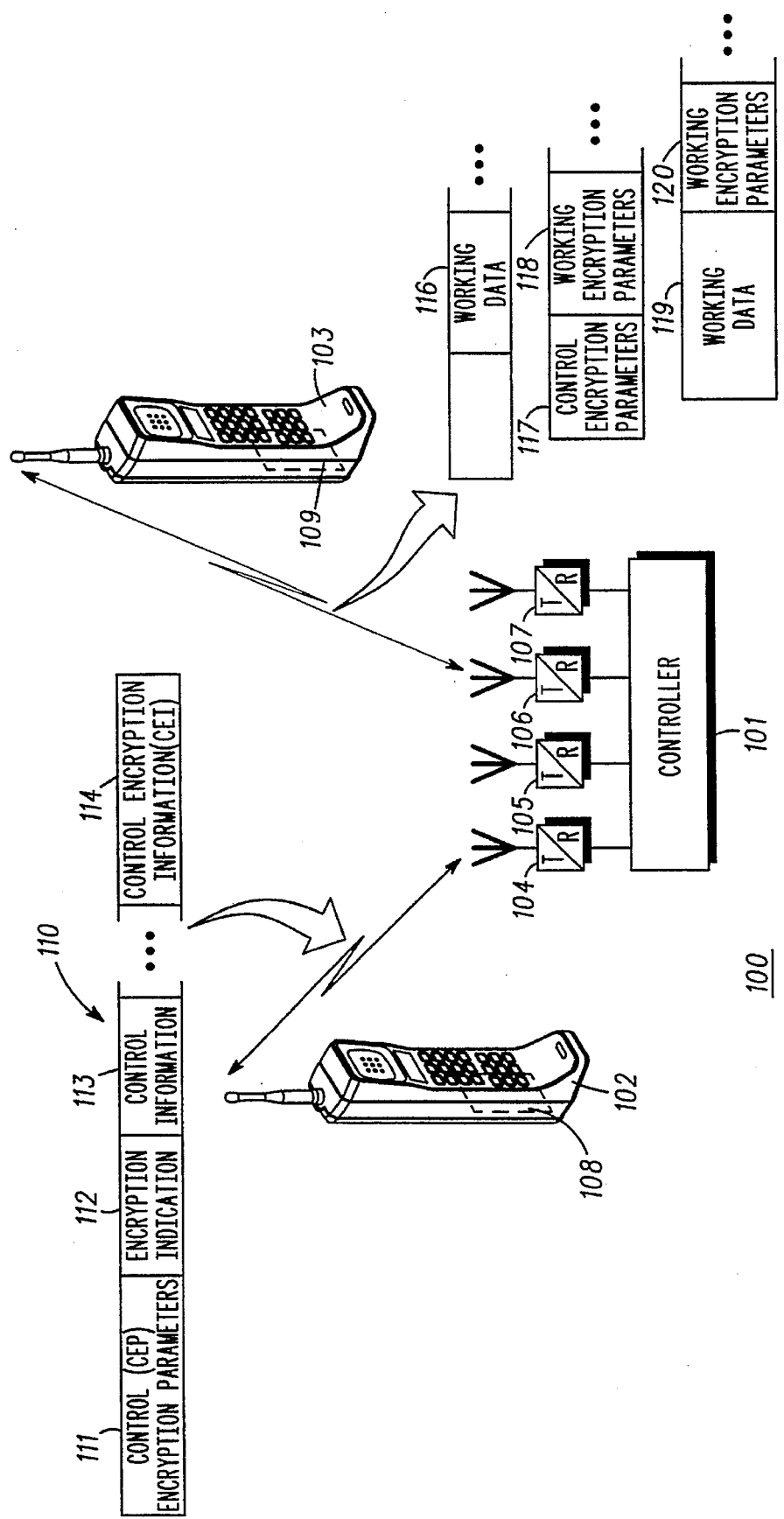
FIG. 1 illustrates a block diagram of a secure radio trunking communication system in accordance with the present invention.

The present invention can be more fully described with reference to FIG. 1 and FIG. 2. FIG. 1 illustrates a secure radio trunking communication system 100 that includes secure communication units 102 and 103 and a controller 101 operably connected to base stations 104–107. Base station 104 provides a control channel and base stations 105–107 provide working channels. The controller 101 could be a Motorola SmartNet™ or Motorola SmartZONE™ controller, operating with secure communication units 102 and 103 such as Motorola Spectra™ mobiles and/or Motorola Saber™ portables. The secure communication units 102 and 103 are capable of operating in secure or non-secure mode.

The secure radio communication system 100 may use one or more encryption algorithms, such as the Data Encryption Standard (DES), Escrow Encryption Standard (EES), and BATON (i.e., a federal standard Type 1 encryption algorithm), to encrypt/decrypt information. These encryption algorithms use a Key Identifier (KID), an Algorithm Identifier (AID), and a Message Indicator (MI), where the KID is a label that identifies an encryption key, the AID identifies the algorithm, and the MI represents the state of the algorithm.

When using the DES algorithm, for example, a starting point, i.e., the initial MI, is required to begin encryption/decryption. This starting point is a 64 bit vector that is initially loaded into an input register for application to the encryption algorithm. During the process of encryption/decryption the encryption algorithm generates and uses many consecutive input register values, where each register value provides a new MI. Hence, during secure communication on a control channel using DES, the AID and the KID are constant while the MI changes continuously.

Referring again to FIG. 1, information communicated on the control channel 104 include control encryption parameters (CEP) 111, encryption indication 112, control information 113 and control encryption information (CEI) 114. Except for the encryption indication 112, the control encryption parameters (CEP) 111, control information 113 and control encryption information (CEI) 114 may be communicated securely on the control channel 104. The CEP 111 provide information, that may include the MI, which enables the secure communication unit 102 and 103 to maintain synchronization with the controller 101, and continue communicating securely on the control channel 104. The encryption indication 112 indicates whether information is being communicated in secure or non-secure mode, and is used by the controller 101 and the communication units 102 and 103 to determine when to encrypt/decrypt information on the control channel 104. When the encryption indication 112 indicates non-secure mode, the information being communicated is not protected. The control information 113, provides the operational information such as channel requests, channel assignments, call service updates and status updates. The CEI 114 provides the secure communication unit 102 and 103 with the capability to use the CEP 111 to communicate securely on the control channel 104 and may include the AID and the KID.

Information communicated on a working channel 105–107 includes working data 116, 119, working encryption parameters 118, 120 and control encryption parameters (CEP) 117. This information may also be communicated securely on the working channel 105–107. The working data 116, 119 provides the information to be conveyed and the working encryption parameters 118, 120, provide an update that enables a secure communication unit 102 and 103 to continue communicating securely on the working channel 105–107. The CEP 117, provides information, that may include the MI, which enables a secure communication unit 102 and 103 to continue communicating securely on the control channel 104.

The communication units 102 and 103, are each provided with a memory device, 108 and 109 respectively, to store information. These memory devices may include RAM, ROM, programmable memory or any other means of storing digital information. Information stored in the memory device 108 and 109 may include the CEI 114, the CEP 111 and 117, and the working encryption parameters 118 and 120.

When the secure communication unit 102 and 103 is turned on or comes into the coverage area of the secure communication system 100, the secure communication unit 102 and 103 obtains secure status by: transmitting a request for the CEP to the controller 101 on the control channel 104, where the request is encrypted using a predetermined algorithm; determining, by the controller 101, that the secure communication unit 102 and 103 is authorized; and providing by the controller 101, the CEI 114 and CEP 111 to the secure communication unit 102 and 103 on the control channel 104, or on a temporarily assigned working channel 105–107, where the CEI 114 and CEP 111 are encrypted using the predetermined algorithm. Alternatively, the secure communication unit 102 and 103 may obtain secure status by communicating with the controller 101, on the control channel 104, in non-secure mode. In addition, the predetermined encryption algorithm may be determined by the controller 101, and may be used as a default encryption algorithm by the secure communication unit 102 and 103 when the stored CEP is not synchronized with the CEP at the controller.

Having obtained secure status, the secure communication unit 102 and 103 stores the CEI 114 and the CEP 111 in the memory 108 and 109, and may then use the stored CEI 114 and CEP 111 to communicate securely on the control channel 104. This initial CEP may include the initial MI that provides a starting point for a first encryption algorithm.

Figure 2:
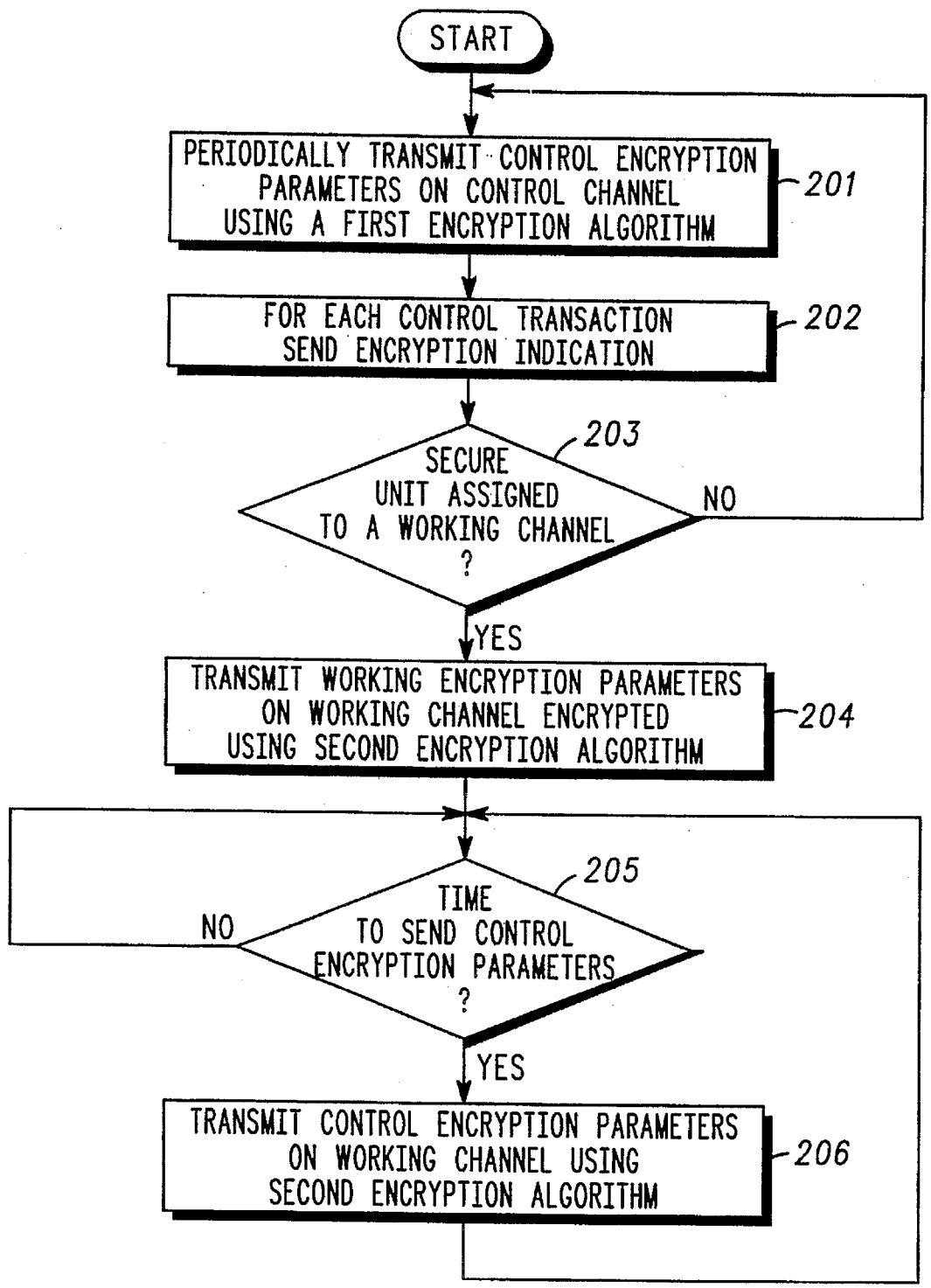
FIG. 2 illustrates a logic diagram detailing the operation of a secure radio trunking communication system in accordance with the present invention.

Referring now to FIG. 2, the controller periodically transmits the CEP to the secure communication unit on the control channel, where the CEP are encrypted using the first encryption algorithm 201, and where the first encryption algorithm may be determined from the stored CEI. Alternatively, the CEP may be transmitted periodically in non-secure mode. The periodic transmissions of the CEP typically occur at time intervals of several hundred milliseconds, and are used to maintain synchronization of the stored CEP in the secure communication unit. With each transaction on the control channel, including the periodic transmission of the CEP, the controller transmits an encryption indication on the control channel to indicate the transaction is encrypted 202. With the encryption indication included in each control transaction, the controller may communicate with non-secure communication units, and in addition, the encryption indication allows secure communication units that are unable to obtain secure status to communicate on the secure communication system in non-secure mode.

While on the control channel, the secure communication unit continues to receive the periodic transmissions of the CEP. When the controller assigns the secure communication unit to a working channel 203, the secure communication unit responds by moving away from the control channel and affiliates with the working channel. Once affiliated with the working channel, the controller may transmit the working encryption parameters to the secure communication unit on the working channel, where the working encryption parameters are encrypted using a second encryption algorithm 204. Alternatively, as described by prior art, the secure communication unit may transmit the working encryption parameters to other secure communication units affiliated with the working channel, and in addition, the working encryption parameters may be transmitted in non-secure mode.

When using the second encryption algorithm, the working encryption parameters may be determined as a function of the second encryption algorithm. In addition, the second encryption algorithm may be predetermined by the secure communication system and may be the same as the first encryption algorithm.

On receipt of the working encryption parameters, the secure communication unit may communicate securely on the working channel. When the controller determines that it is time to send the CEP 205 to the secure communication unit, i.e., a periodic interval expires, the controller transmits the CEP on the working channel, where the CEP are encrypted using the second encryption algorithm 206. Alternatively, the CEP may be transmitted on the working channel in non-secure mode. Hence, while the secure communication unit is operating on the working channel, the controller continues to periodically send the CEP, thereby, maintaining synchronization of the stored CEP. When communication is concluded on the working channel, the secure communication unit returns to the control channel and may use the stored CEP to communicate securely with the controller.

The present invention provides a method of maintaining secure information synchronization on a control channel of a secure radio trunking communication system. With such a method secure information synchronization can be maintained on the control channel without reducing the efficiency of the control channel and with minimal impact on the design and resources of a secure communication unit. In addition, when using the present invention the secure communication unit may communicate on a working channel indefinitely and be able to return to the control channel and communicate securely.

What is claimed is:

1. In a communication system that provides secure communications, a method for maintaining secure information synchronization on a control channel, the method comprising the steps of:

a) periodically transmitting control encryption parameters on the control channel, wherein the control encryption parameters are encrypted using a first encryption algorithm;

b) when a secure communication unit is assigned a working channel, transmitting working encryption parameters on the working channel, wherein the working encryption parameters are encrypted using a second encryption algorithm; and c) when the secure communication unit is assigned the working channel, transmitting the control encryption parameters on the working channel, wherein the control encryption parameters are encrypted using the second encryption algorithm.

2. The method of claim 1, wherein step (c) further comprises transmitting the control encryption parameters periodically to the secure communication unit.

3. The method of claim 1, wherein step (a) further comprises providing an encryption indication for each control transaction, wherein the encryption indication indicates whether a particular control transaction is encrypted.

4. In a communication system that provides encrypted communications, a method for maintaining secure information synchronization on a first channel, the method comprising the steps of:

a) periodically transmitting first encryption parameters on the first channel, wherein the first encryption parameters are encrypted using a first encryption algorithm;

b) when a secure communication unit is assigned a second channel, transmitting second encryption parameters on the second channel, wherein the second encryption parameters are encrypted using a second encryption algorithm; and c) when the secure communication unit is assigned the second channel, transmitting the first encryption parameters on the second channel, wherein the first encryption parameters are encrypted using the second encryption algorithm.

5. The method of claim 4, wherein step (c) further comprises transmitting the first encryption parameters periodically to the secure communication unit.

6. The method of claim 4, wherein step (a) further comprises providing an encryption indication for each control transaction, wherein the encryption indication indicates whether a particular control transaction is encrypted.

7. A method for a secure communication unit to maintain secure information synchronization on a control channel, the method comprising the steps of:

a) periodically receiving control encryption parameters on the control channel, wherein the control encryption parameters are encrypted using a first encryption algorithm;

b) transmitting a request on the control channel, wherein the request is encrypted using the first encryption algorithm;

c) receiving on the control channel an assignment to a working channel, wherein the assignment is encrypted using the first encryption algorithm;

d) affiliating with the working channel;

e) while affiliated with the working channel, receiving working encryption parameters, wherein the working encryption parameters are encrypted using a second encryption algorithm; and f) while affiliated with the working channel, receiving the control encryption parameters, wherein the control encryption parameters are encrypted using the second encryption algorithm.

8. The method of claim 7, wherein step (f) further comprises receiving the control encryption parameters periodically.

9. The method of claim 7 further comprises, prior to step (a), obtaining secure status.

10. The method of claim 9, wherein the step of obtaining secure status further comprises the steps of:

requesting the control encryption parameters on the control channel,
wherein the request is encrypted using a predetermined encryption algorithm; and receiving the control encryption parameters on the control channel;
wherein the control encryption parameters are encrypted using the predetermined encryption.

11. In a communication system that provides secure communications, a method for maintaining secure information synchronization on a control channel, the method comprising the steps of:

a) periodically transmitting control encryption parameters on the control channel;

b) encrypting control information transceived over the control channel using the control encryption parameters; and c) when a secure communication unit is communicating on a working channel, transmitting the control encryption parameters to the secure communication unit on the working communication channel.

12. The method of claim 11, wherein step (c) further comprises transmitting the control encryption parameters periodically to the secure communication unit.

13. A method for a secure communication unit to maintain secure information synchronization on a control channel comprising the steps of:

a) encrypting control information transceived over the control channel using control encryption parameters, wherein the control encryption parameters are periodically received on the control channel; and b) when affiliated with a working channel, periodically receiving the control encryption parameters on the working communication channel.

* * * * *